A. F. WAY.
ASH PAN.
APPLICATION FILED JUNE 26, 1917.
1,275,335.
Patented Aug. 13, 1918.
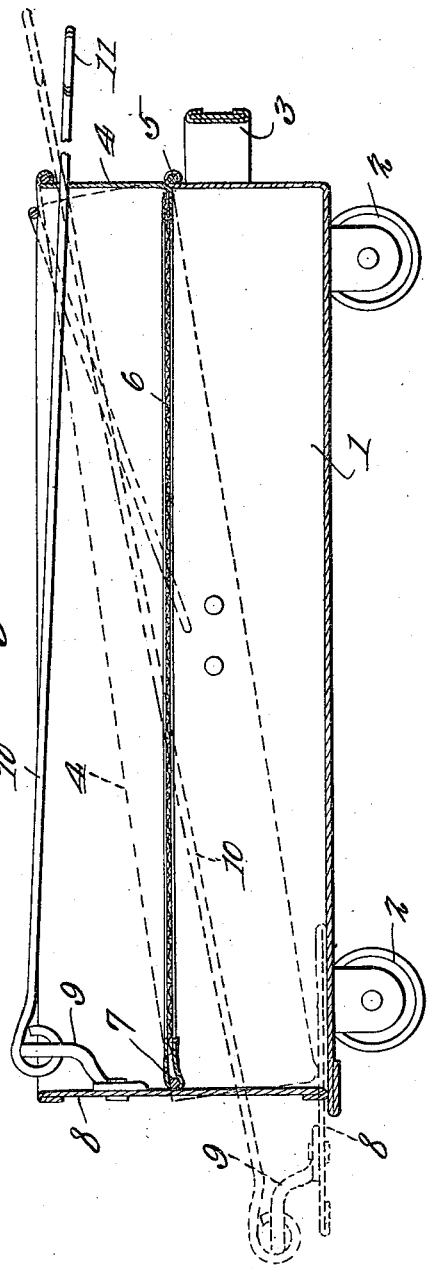
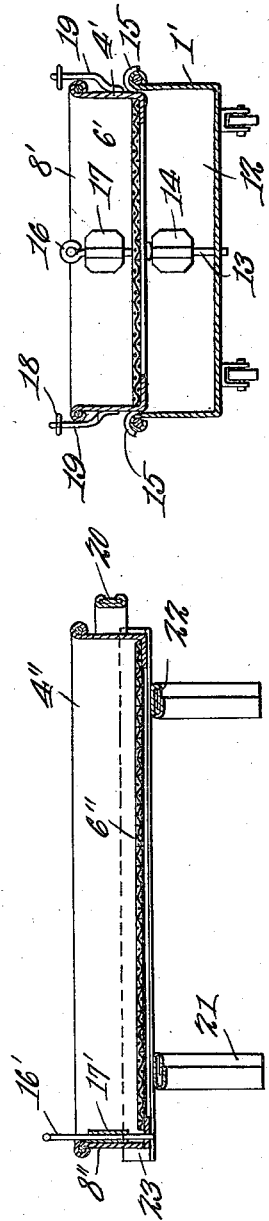
Witness
Inventor
Alfred F. Way
By C. A. Snow & Co.
Attorneys

UNITED STATES PATENT OFFICE.

ALFRED F. WAY, OF CHARLOTTE, MICHIGAN.

ASH-PAN.

1,275,335.

Specification of Letters Patent.

Patented Aug. 13, 1918.

Application filed June 26, 1917. Serial No. 177,102.

*To all whom it may concern:*

Be it known that I, ALFRED F. WAY, a citizen of the United States, residing at Charlotte, in the county of Eaton and State of Michigan, have invented a new and useful Ash-Pan, of which the following is a specification.

The subject of this invention is an ash pan wherein a pan is operatively associated with a sieve, and the objects of the invention are, first, to provide a combined sieve and ash pan, second, to provide means for dumping the pan and sieve, third to provide a simple and efficient ash pan.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

A practical embodiment of the invention is shown in the accompanying drawing, wherein:

Figure 1 is a central vertical longitudinal section of an ash pan constructed in accordance with my invention, the sieve shown dumped in dotted lines.

Fig. 2 is a vertical cross section showing a modification of the device.

Fig. 3 is a vertical longitudinal section of another modification.

Referring to the drawing by numerals of reference:

A pan 1 is mounted on castors 2 and is provided at its forward end with a handle 3.

Seated on the pan 1 is another pan 4 which is hinged to the forward end of the lower pan as indicated at 5. The bottom of the upper pan 4 is formed of wire mesh 6 to form a sieve. Hinged to the rear end of the pan 4 by the hinge 7 is a plate 8 which forms a closure for the rear ends of the pans 1 and 4. An eye bracket 9 is secured to the inner face of the plate 8 near the upper edge of the plate and this bracket is engaged by the eye end of a horizontally disposed rod 10 which extends through an aperture formed in the front end of the pan 4. The rod 10 slides in the aperture and has a handle 11 formed at its extending, free end.

In the modified form shown in Fig. 2 the pan 1' is similar to the pan 1 except that the rear end is closed by a swinging end plate 12 which has its upper edge pivotally secured to the sides of the pan. The plate 12 is held in closed position by a sliding pin 13 which is held on the plate 12 by a retaining piece 14. The lower end of the pin 13 enters a suitable aperture formed in the bottom of pan 1'. The upper pan 4' is provided with outwardly projecting lugs 15 at its lower edge which are adapted to be seated on the rim of pan 1'. This pan is similar to the pan 4 except that a rear plate 8' is provided to close the rear end of the pan, and this plate has its upper edge pivotally secured to the sides of the pan. The plate is held in closed position by a pin 16 which is slidably held on the plate by a retaining piece 17, or otherwise. The lower end of pin 16 is adapted to enter an aperture formed in the bottom of pan 4'. A bail shaped handle 18 is secured to ears 19 on the pan 4'.

The structure of the ash pit of some stoves and furnaces is such that the forms of the device shown in Figs. 1 and 2 cannot be readily used. To meet this the modification shown in Fig. 3 was devised.

In this instance the pan 4'', which is similar to the pan 4', is provided with a bottom 6 formed of wire mesh, and has a pivoted rear end 8'' which is held in place by a pin 16' which enters a suitable aperture formed in the bottom of the pan. The pin 16' is slidably held on the end 8'' by the retaining plate 17''. The pan is provided with a handle 20 by which it may be reciprocated in sifting the contents.

The pan 4'' rests on a support composed of legs 21 connected by cross pieces 22, which are preferably integral with the legs, and upon the cross pieces are secured side bars 23 formed of angle iron. The side bars 23 are arranged with their horizontally disposed flanges extending inwardly, and the vertically disposed flanges extending upwardly to receive and slidably retain the pan 4''.

In practice the device is operated as follows: The pan is placed in the ash pit of a furnace range or stove and the ashes from the grate fall into the pan 4 or 4'. The ash pit door may be opened and the pan reciprocated back and forth on its rollers 2 or 2' to cause the ashes in pan 4 or 4' to be sifted.

The pan may then be removed from the ash pit and the upper pan 4 held in horizontal position while the lower pan 1 is allowed to pivot on its hinge 5 and dump its contents through its rear end. The lower pan is then brought back into position and the rod 10 pushed in which will lower the rear end of pan 4, as seen in dotted lines, Fig. 1, and cause the contents to be dumped.

When the modified form is in use the pin 13 may be drawn up to allow the plate to swing to opened position. The pan 1' may then be dumped. The same operation may then be performed with respect to pan 4'.

When the modification shown in Fig. 3 is used, the ash pit door being opened, the handle of the pan is grasped and the pan reciprocated on its support to sift the ashes. The pan may then be removed and the cinders dumped therefrom as described.

It is of course understood that a pan to catch the sifted ashes may be placed below the support shown in Fig. 3.

Having described my invention, what I claim as new and desire to secure by Letters Patent, is:

1. An ash pan, including a lower pan, a sieve mounted on the pan, means hinged to the rear end of the pan and normally closing the pan, and means for moving the closing means to a position upon the bottom of the pan to lower the sieve to inclined position.

2. An ash pan, including a lower pan, a sieve hinged to the pan at one end thereof, a plate hinged at the rear end of the sieve and normally closing the rear end of the pan and sieve, and a rod for rocking the plate on its hinge to rest upon the bottom of the pan and support the sieve in inclined position.

3. An ash pan comprising a support, a pan on the support, a wire mesh bottom for the pan, a pivotally mounted end for the pan, means for normally locking the end against pivotal movement, and means for rocking the end to contact the support and lower the pan to inclined position.

In testimony that I claim the foregoing as my own I have hereto affixed my signature in the presence of two witnesses.

ALFRED F. WAY.

Witnesses:
JULIUS B. ELLS,
ALONZO H. BROOKS.

Copies of this patent may be obtained for five cents each, by addressing the "Commissioner of Patents, Washington, D. C."